T. HULETT.
AUTOMOBILE STARTER.
APPLICATION FILED NOV. 27, 1912.
1,106,449.
Patented Aug. 11, 1914.
2 SHEETS—SHEET 1.
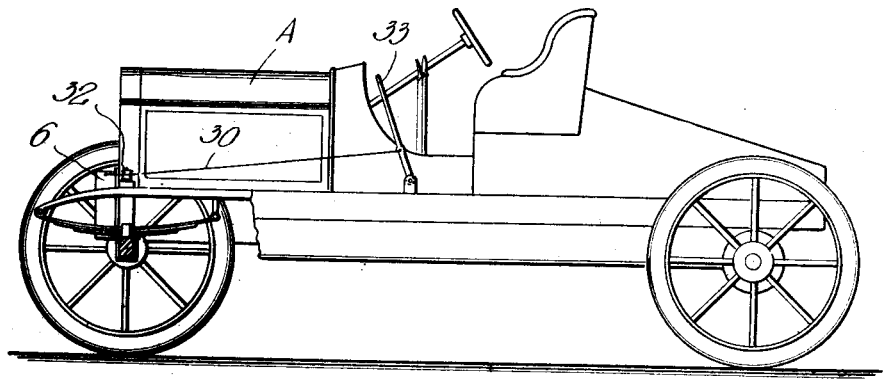
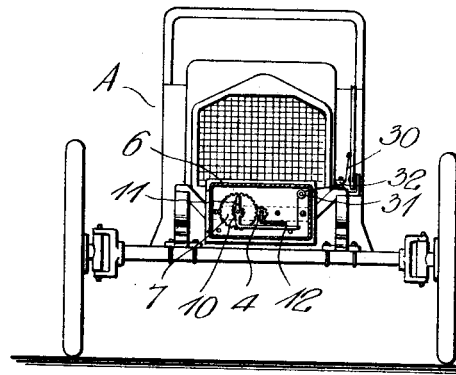
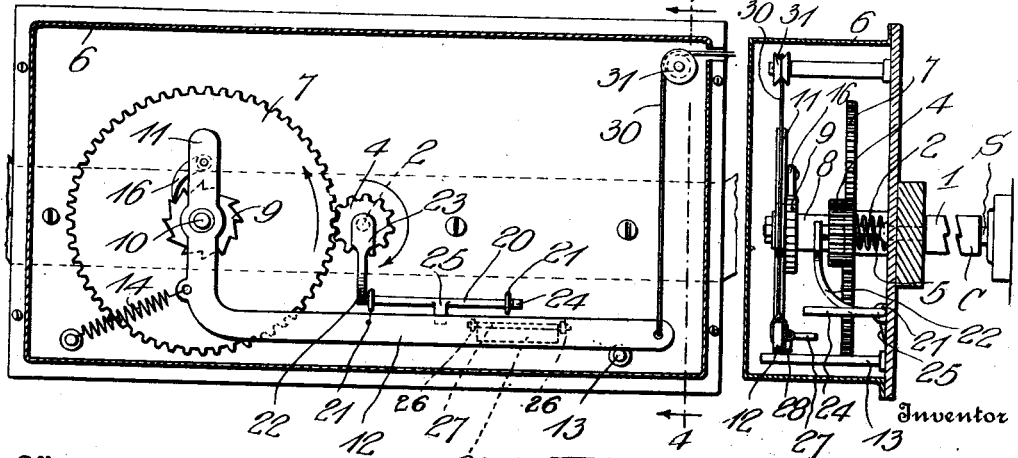
Witnesses
Inventor
Thomas Hulett
By
Attorneys T. HULETT.
AUTOMOBILE STARTER.
APPLICATION FILED NOV. 27, 1912.
1,106,449.
Patented Aug. 11, 1914.
2 SHEETS—SHEET 2.
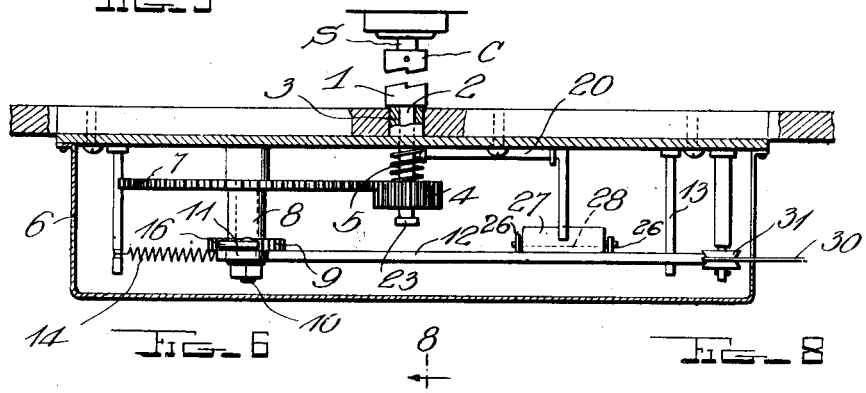
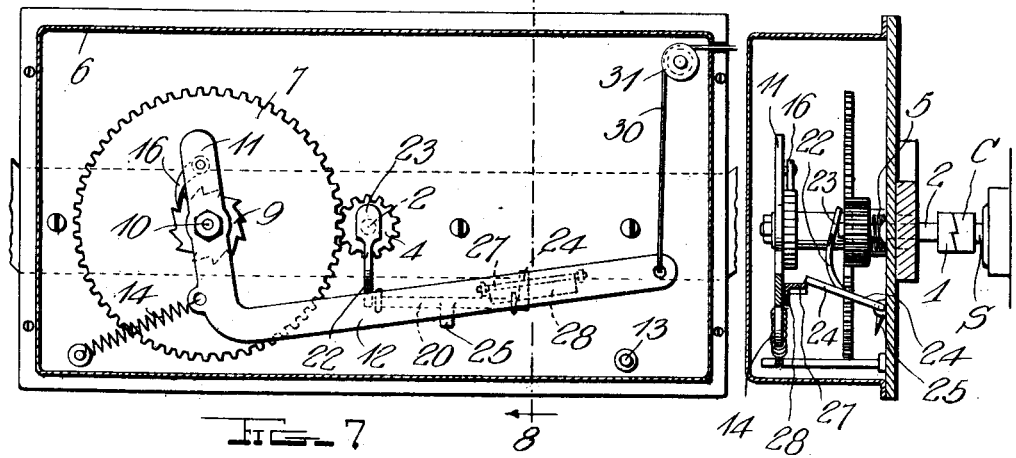
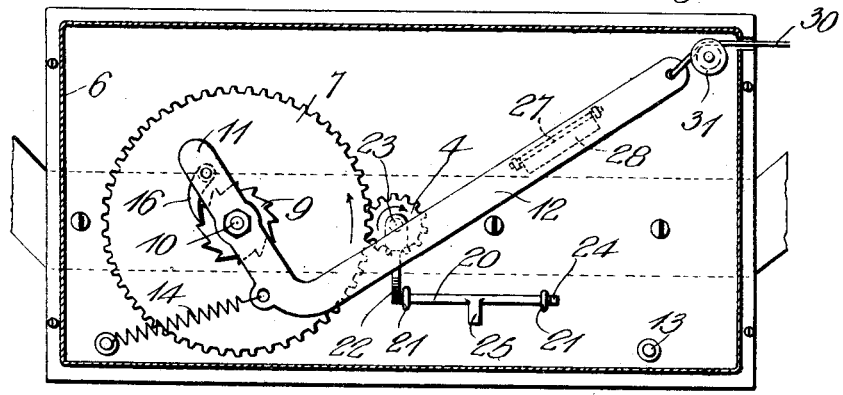
Witnesses
Inventor
Thomas Hulett
By
Attorneys

UNITED STATES PATENT OFFICE.

THOMAS HULETT, OF CHICAGO, ILLINOIS.

AUTOMOBILE-STARTER.

1,106,449.      Specification of Letters Patent.      Patented Aug. 11, 1914.

Application filed November 27, 1912. Serial No. 733,874.

*To all whom it may concern:*

Be it known that I, THOMAS HULETT, a subject of the King of England, residing at Chicago, in the county of Cook and State of Illinois, have invented certain new and useful Improvements in Automobile-Starters; and I do declare the following to be a full, clear, and exact description of the invention, such as will enable others skilled in the art to which it appertains to make and use the same.

This invention relates to certain improvements for starting the engine of automobiles by lever power.

It consists of a device, as hereinafter described, to start the engine from the seat of the automobile by merely pulling a lever, thereby removing the necessity of getting out of the car and cranking the engine by means of a handle as is done at the present time. This device is simple in construction and can be operated very easily by anyone, either man or woman, from the driver's seat.

The invention consists in the details of construction hereinafter more fully described and claimed, and as shown in the drawings wherein—

Figure 1 is a side elevation of an automobile equipped with this starter, and Fig. 2 a front elevation thereof with the face plate of its casing removed. Fig. 3 is an enlarged front elevation of the starting mechanism with the face plate of its casing removed, and Fig. 4 is a cross section on the line 4—4 of Fig. 3. Fig. 5 is a top view of the starting mechanism with the upper plate of its casing removed so as to give practically a plan view of the mechanism, with which is associated the clutch at the front end of the engine shaft. Figs. 6 and 7 are elevations of the mechanism, much like that shown in Fig. 3; and Fig. 8 is a vertical section on the line 8—8 of Fig. 6 with the parts standing in the position there shown.

In the drawings the letter A designates an automobile, whose engine shaft S has a clutch member C of the ratchet type at its front end which is adapted to be engaged by the clutch member 1 at the rear end of the ordinary starting mechanism. Said member is mounted on the inner extremity of a short shaft section 2 which passes slidably and revolubly through a bearing 3 beneath the radiator as usual, and in the present instance carries a rather wide driven gear pinion near its front end as indicated by the numeral 4 in the drawings, an expansive spring 5 being coiled around the shaft between the pinion and the bearing so as to throw the clutch members C and 1 normally out of engagement. Surrounding this gear wheel is a casing 6 of any approved type, to contain the starting mechanism yet to be described, and this casing may have its front provided with an opening or entirely hinged so that access to its interior may be had.

Coming now more particularly to the details of the present invention other than as above mentioned, the pinion 4 is engaged with a rather large driving gear 7 journaled within the casing, and the hub 8 of this gear carries a ratchet wheel 9 as shown. Said hub is mounted on a pin 10 which projects forward within the casing, and on the pin is pivoted the upright arm 11 of an L-shaped lever, whose lower arm 12 lies normally horizontal and near the bottom of the casing as best seen in Fig. 3 and at this time rests upon a stop 13. To assist the lever in assuming this position, in case the parts should become stuck, I preferably employ a spring 14 located as shown or elsewhere so that its result will be attained. The upper end of the upright arm 11 carries a pawl 16 normally engaging said ratchet wheel 9. It follows that when the lever is turned to throw said pawl to the left and downward around the pivot pin 10, the pawl will turn the ratchet and the ratchet will turn the hub and driving gear, and the latter being connected with the driven pinion 4 will cause the rotation of the shaft section 2. In order to throw said clutch members into engagement so that the automobile engine may be cranked, I provide a rock shaft 20 mounted in bearings or eyes 21 projecting from the rear wall of the casing, and having at one end an upstanding arm 22 carrying a plate 23 which is adapted to make contact with the front end of the shaft section 2. The other end of said rock shaft 20 carries a forwardly projecting arm 24 which stands in rear of the lower arm 12 of the lever; and depending from the body of the rock shaft is a stop or lug 25 which holds this element normally as seen in Fig. 4. Pivoted in eyes 26 on the rear side of the lower arm of the main lever is a lifter consisting of a lip 27 and a weight 28 depending rigidly from its pivot line at right angles to the lip so that when this weight rests against the rear side of said main lever 12 the lip projects horizontally to the rear. Any suitable means may be employed for swinging said main lever, but in the present instance I have shown a rope or chain 30 led upward from its free outer end over a pulley 31 within the casing 6, and thence over another pulley 32 in or on the automobile hood and alongside the same to a hand lever 33 which stands within reach of the driver or of a passenger mounted on the seat of the automobile. However, this illustration is merely typical, as any other means could be employed for raising the main lever from a position on the seat and without leaving the automobile, without departing from the principle of my invention.

With the above construction of parts, the operation of this device is as follows: When the hand lever 33 is drawn to the rear, the rope or chain 30 is drawn upon and the free end of the main lever is raised from the position shown in Figs. 3 and 4, through the position shown in Figs. 6 and 8, to the position shown in Fig. 7. In the rise of this lever the lip 27 contacts with the forward end of the arm 24 of the rock shaft 20, raises it, and finally slips past it, and said shaft is turned in its bearings or eyes 21 so that its other upstanding arm 22 is borne inward, and the plate 23 at the extremity thereof presses upon the front end of the shaft section 2 and pushes the same inward as seen in Fig. 8 so that the clutch members C and 1 engage each other. As seen in Figs. 6 and 8, this engagement occurs when the main lever has turned but little around its pivot 10. The rock shaft 20 and its two arms now drop back so that the lower arm 24 again stands horizontal. Continued movement of the main lever in the direction described throws its pawl 16 into engagement with the ratchet wheel and causes the rotation of the driving gear 7 in the direction indicated by the arrows in Figs. 3 and 7, which of course rotates the gear pinion 4 in the opposite direction and therefore cranks the automobile engine. As soon as the latter commences to run, the rapid rotation of its shaft S throws the clutch members out of engagement—assisted by the expansive force of the spring 5—so that the shaft section 2 is moved forward to the position shown in Fig. 4. If the operator has not yet released his tension on the rope or chain 30, the lip 27 will now be above said arm 24, and therefore when he does release said tension and permits the main lever to descend the lip will have to turn on its pivots 26 as its weight 28 will permit and pass the free end of the arm 24 in a manner which will be clear.

All parts of this device are by preference of metal, properly treated to prevent rust, and as compact and yet as strong as possible consistent with the work they are to perform. While the casing is not absolutely necessary, I prefer to employ it so as to inclose the mechanism and protect the parts from dirt. I might add, that owing to the difference in size between the driving and driven gears, one impulse of the main lever which turns the driving gear through a part of a revolution imparts one or more complete revolutions to the driven pinion; and if the first impulse does not crank the engine it is possible for the operator to let up on the rope or chain 30, drop the main lever 12, and give it another impulse. This is permitted by the pawl and ratchet connection between the upright arm 11 of said lever and the hub of the driving gear, and the fact that the latter is a gear instead of a rack bar as commonly employed in devices of this character. Moreover, when the engine starts running, if the clutch elements should not instantly disengage each other the only result will be that the pinion 4 will cause the rotation of the gear 7 in the direction shown by the arrow and the teeth of the ratchet wheel 9 will slip idly over the tip of the pawl 16.

It will be obvious that this improved starter can be applied to any type of automobile at the time it is built, or can be attached to it later, providing only that the ordinary starting crank is removed and a clutch member 1 at the inner extremity of the shaft section 2 is employed which is of such shape as to fit the clutch element C on the shaft S of the engine motor.

What is claimed as new is:

1. In an engine starter, the combination with the engine shaft having a clutch element, a shaft section in line therewith and having another clutch element, a bearing in which this section is mounted for rotation and longitudinal movement, a wide gear pinion fast on this shaft section, and a spring for throwing said elements normally out of engagement; of a driving gear in constant mesh with said pinion, a ratchet fast on its hub, a lever mounted on a pivot, a pawl carried by said lever and engaging said ratchet, means for swinging the lever, and devices actuated by the movement of the lever in one direction for sliding said shaft section until the clutch elements engage.

2. In an engine starter, the combination with the engine shaft having a clutch element, a shaft section in line therewith and having another clutch element, a bearing in which this section is mounted for rotation and longitudinal movement, a wide gear pinion fast on this shaft section, and a spring for throwing said elements normally out of engagement; of a driving gear in constant mesh with said pinion, a ratchet fast on its hub, a main lever mounted on a pivot concentric with the pivot of said gear and ratchet, manually operable means for swinging said main lever, means for sliding said shaft section until said clutch elements engage, and devices carried by said main lever for actuating said sliding means.

3. In an engine starter, the combination with the engine shaft having a clutch element, a shaft section in line therewith and having another clutch element, a bearing in which this section is mounted for rotation and longitudinal movement, a wide gear pinion fast on this shaft section, and a spring for throwing said elements normally out of engagement; of a driving gear in constant mesh with said pinion, a ratchet fast on its hub, a main lever mounted on a pivot concentric with the pivot of said gear and ratchet, a pawl carried by said lever and engaging said ratchet, manually operable means for swinging said main lever, a rock shaft having an arm provided with a plate standing against the front end of said shaft section and a second arm projecting toward said main lever, and a lifter on the latter for raising the last-named arm.

4. In an engine starter, the combination with the engine shaft having a clutch element, a shaft section in line therewith and having another clutch element, a bearing in which this section is mounted for rotation and longitudinal movement, a wide gear pinion fast on this shaft section, and a spring for throwing said elements normally out of engagement; of a driving gear in constant mesh with said pinion, a ratchet fast on its hub, a main lever mounted on a pivot concentric with the pivot of said gear and ratchet, a pawl carried by said lever and engaging said ratchet, manually operable means for swinging said main lever, a rock shaft having an arm provided with a plate standing against the front end of said shaft section and a second arm projecting toward said main lever, and a lifter consisting of a lip standing beneath said last-named arm, pivots connecting the forward edge of said lip with the rear of said main lever, and a weight depending rigidly from the lip and holding it normally horizontal, for the purpose set forth.

5. In an engine starter, the combination with the engine shaft having a clutch element, a shaft section in line therewith and having another clutch element, a bearing in which this section is mounted for rotation and longitudinal movement, a wide gear pinion fast on this shaft section, and a spring for throwing said elements normally out of engagement; of a driving gear in constant mesh with said pinion, a manually operable lever mechanism for turning said gear at will, a lifter pivoted to said lever and having a lip, means for holding the lip horizontal when the lever ascends and permitting it to turn when the lever descends, and a rock shaft having an arm at one extremity standing in front of said shaft section and another arm at the other extremity standing in position to be raised by said lip when the main lever ascends.

6. In an engine starter, the combination with the engine shaft having a clutch element, a shaft section in line therewith and having another clutch element, a bearing in which this section is mounted for rotation and longitudinal movement, a pinion fast on this shaft section, and a spring for throwing said elements normally out of engagement; of a manually operable lever, connections between it and said pinion for turning the latter, a lifter pivoted to the lever, means for holding the lifter horizontal when the lever ascends and permitting it to turn when the lever descends, a rock shaft having an arm at one extremity provided with a plate standing in front of said shaft section and another arm at the other extremity standing in position to be raised by said lifter when the lever ascends, and a lug on said rock shaft for holding the last-named arm normally horizontal.

In testimony whereof I have hereunto set my hand in presence of two subscribing witnesses.

THOMAS HULETT.

Witnesses:
 Lizie Thomas,
 Daisy E. Frear.

Copies of this patent may be obtained for five cents each, by addressing the "Commissioner of Patents, Washington, D. C."